United States Patent [19]

Abe et al.

[11] Patent Number: 4,866,620
[45] Date of Patent: Sep. 12, 1989

[54] CONTROL SYSTEM AND METHOD FOR AN INTERNAL COMBUSTION ENGINE, OBTAINING AIR PRESSURE AFTER BOTTOM DEAD CENTER

[75] Inventors: Tomoaki Abe, Obu; Masahi Kiyono, Anjo; Mitsunori Takao, Kariya, all of Japan

[73] Assignee: Nippondenso Co., Ltd., Kariya, Japan

[21] Appl. No.: 85,357

[22] Filed: Aug. 14, 1987

[30] Foreign Application Priority Data

Aug. 29, 1986 [JP] Japan .................................. 61-204534

[51] Int. Cl.$^4$ ............................................. F02D 35/00
[52] U.S. Cl. .......................... 364/431.05; 364/431.04; 123/435; 123/407
[58] Field of Search ....................... 364/431.05, 431.04, 364/431.12, 431.11; 123/416, 492, 480, 478, 494, 435, 407, 410, 412

[56] References Cited

U.S. PATENT DOCUMENTS

| | | | |
|---|---|---|---|
| 3,747,577 | 7/1973 | Mauch et al. | 123/494 |
| 4,166,437 | 9/1979 | Bianchi et al. | 123/416 |
| 4,385,606 | 5/1983 | Hattori et al. | 123/416 |
| 4,510,569 | 4/1985 | Takao et al. | 364/431.12 |
| 4,590,563 | 5/1986 | Matsumura et al. | 364/431.05 |
| 4,598,684 | 7/1986 | Kato et al. | 123/478 |
| 4,646,698 | 3/1987 | Inoue et al. | 123/478 |
| 4,723,519 | 2/1988 | Ito et al. | 123/416 |

FOREIGN PATENT DOCUMENTS

| | | |
|---|---|---|
| 55-116101 | 9/1980 | Japan . |
| 55-141618 | 11/1980 | Japan . |
| 57-28865 | 2/1982 | Japan . |
| 57-125336 | 8/1982 | Japan . |
| 60-47839 | 3/1985 | Japan . |

Primary Examiner—Eugene R. Laroche
Assistant Examiner—Seung Ham
Attorney, Agent, or Firm—Cushman, Darby & Cushman

[57] ABSTRACT

A control system and method for an internal combustion engine in which an intake air pressure sensor of semiconductor or strain gauge type arranged in an intake manifold is used to detect the intake air pressure at a timing at or after bottom dead center during the intake stroke, the timing being detected by detection of a predetermined crank angle at or after bottom dead center or the zero of intake air flow rate. Operating conditions of the internal combustion engine are controlled early by an air pressure detection signal. For example, the air-fuel ratio of the mixture gas before combustion is estimated to control the ignition timing.

14 Claims, 7 Drawing Sheets

FIG. 5 ming the mass
CONTROL SYSTEM AND METHOD FOR AN INTERNAL COMBUSTION ENGINE, OBTAINING AIR PRESSURE AFTER BOTTOM DEAD CENTER

BACKGROUND OF THE INVENTION

The present invention relates to a control system for an internal combustion engine and method thereof, or more in particular to a control system for controlling operating conditions of the internal combustion engine including ignition timing, air-fuel ratio and supercharge pressure by use of parameters determined according to the amount of intake air.

The amount of intake air is a basic amount of control for the internal combustion engine, and control systems for the internal combustion engine is equipped with means for detecting the amount of intake air in order to calculate the amount of fuel injection, estimate the air-fuel ratio of the mixture gas or determine the ignition timing. (See, for example, JP-A-57-28865, etc.). The most desirable configuration of the internal combustion engine for detecting the amount of intake air involved in the combustion in a cylinder is such that the mass velocity of air flowing in the intake manifold is integrated by time in the intake stroke thereby to obtain the mass amount of intake air. Such a means for detecting the amount of intake air is disclosed, for instance, in. U.S. Pat. No. 3,747,577 in which a silicon semiconductor or a hot wire such as platinum adapted for self-heating by energization is provided in a portion of uniform velocity in the intake manifold to detect the mass amount of intake air from the degree of cooling of the hot wire or the like by the intake air. An application of such a means to a control system for an internal combustion engine is under study.

In this type of internal combustion engine control system, however, the configuration of the detection means for measuring the amount of intake air as a mass flow rate is so complicated and bulky as to make practical applications thereof difficult. Another problem is that if the control system uses a microcomputer for integrating the mass flow rate over the intake stroke over the detected small section, the microcomputer operation is occupied exclusively by such a measurement.

Further, in view of the fact that the amount of intake air is detected only by integration over the intake stroke, it may sometimes be difficult to reflect the result in the control with the amount of intake air.

SUMMARY OF THE INVENTION

Accordingly, it is an object of the present invention to solve the above-mentioned problems.

Another object of the present invention is to realize the engine control of high accuracy by obtaining control data exactly corresponding to the amount of intake air introduced to the internal combustion engine with ease and simple construction.

Figure 1:
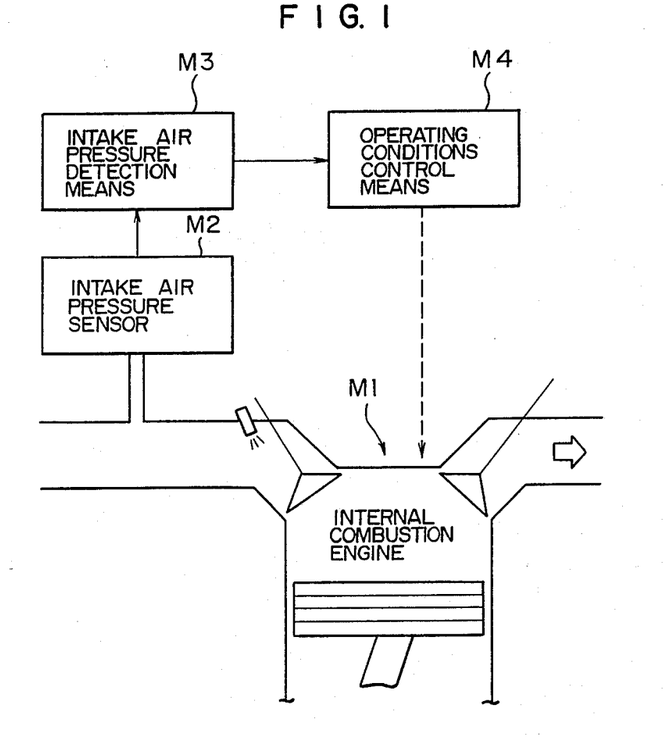
FIG. 1 is a block diagram illustrating a basic configuration of the present invention.

In order to achieve the above-mentioned objects by a means for solving the problems, as shown in FIG. 1 there is provided according to the present invention a control system for controlling the operating conditions of an internal combustion engine M1 with at least a cylinder, comprising an intake air pressure sensor M2 arranged on an intake manifold connected to the cylinder of the internal combustion engine for generating a signal corresponding to the pressure of intake air in the intake manifold, intake air pressure detection means M3 for detecting the intake air pressure in the intake manifold on the basis of a signal corresponding to the pressure of intake air in the intake manifold by the intake air pressure sensor M2 at a predetermined timing on or after the bottom dead center in the intake stroke of the cylinder of the internal combustion engine M1, and an operating condition control means for controlling the operating conditions of the internal combustion engine on the basis of the intake air pressure detected at the intake air pressure detection means M3.

The intake air pressure sensor M2 is provided by such a sensor of semiconductor or strain gauge type as provided at a surge tank of the intake system or the like.

The intake air pressure detection means M3 is for detecting the intake air pressure on the basis of a signal corresponding to the intake air pressure from the intake air pressure sensor M2 at a predetermined timing on or after the bottom dead center in the intake stroke of the cylinder, the predetermined timing being such that the pressure in the cylinder is substantially coincident with the intake air pressure. This timing may be set in advance on the basis of an operation parameter representing the operation of the engine M1, or on the basis of an output of a flow rate sensor arranged in the intake manifold in view of the fact that the pressure in the cylinder is balanced with the intake air pressure with the intake air velocity in the intake manifold fixed at substantially zero in the state where the pressure in the cylinder substantially coincides with the intake air pressure. Also, such a timing may be provided by a predetermined crank angle at or after the bottom dead center in the intake stroke. Although only one such timing may be set for receiving a signal corresponding to the intake air pressure from the intake air pressure sensor M2 in the manner described above, a plurality of adjacent timings may also be set to detect the intake pressure from a plurality of signals received from a plurality of intake air pressure sensors M2.

The operating condition control means M4 is for controlling the operating conditions of the internal combustion engine M1 by use of parameters determined from the intake air pressure detected by the intake air pressure detection means M3 including the intake air pressure itself, the amount of intake air obtained by mathematically processing of the intake air pressure, the air-fuel ratio produced by processing with other operating parameters, load and so on. The operating conditions to be controlled may include various items such as the air-fuel ratio, ignition timing, supercharge pressure or amount of exhaust gas recircurated to the intake manifold that are finally involved in the combustion of the internal combustion engine M1.

As described above in detail, according to the present invention, there is provided a control system for an internal combustion engine with a simple construction having such a conspicuous advantage that an intake manifold pressure exactly corresponding to the amount of air introduced to the engine is easily measured, and by use of parameters (such as amount of intake air, air-fuel ratio or load) determined on the basis of the intake manifold pressure, the operating conditions of the internal combustion engine can be properly controlled. Also, the intake manifold pressure is detected almost simultaneously with the end of the intake stroke of the cylinder, and therefore the control is effected at a very early time in response to parameters determined on the basis of the intake manifold pressure. If the ignition timing is to be controlled with the air-fuel ratio as a parameter, for example, the air-fuel ratio can be estimated before combustion, thus making possible the ignition of the mixture gas at an optimum timing.

DESCRIPTION OF THE PREFERRED EMBODIMENTS

Figure 2:
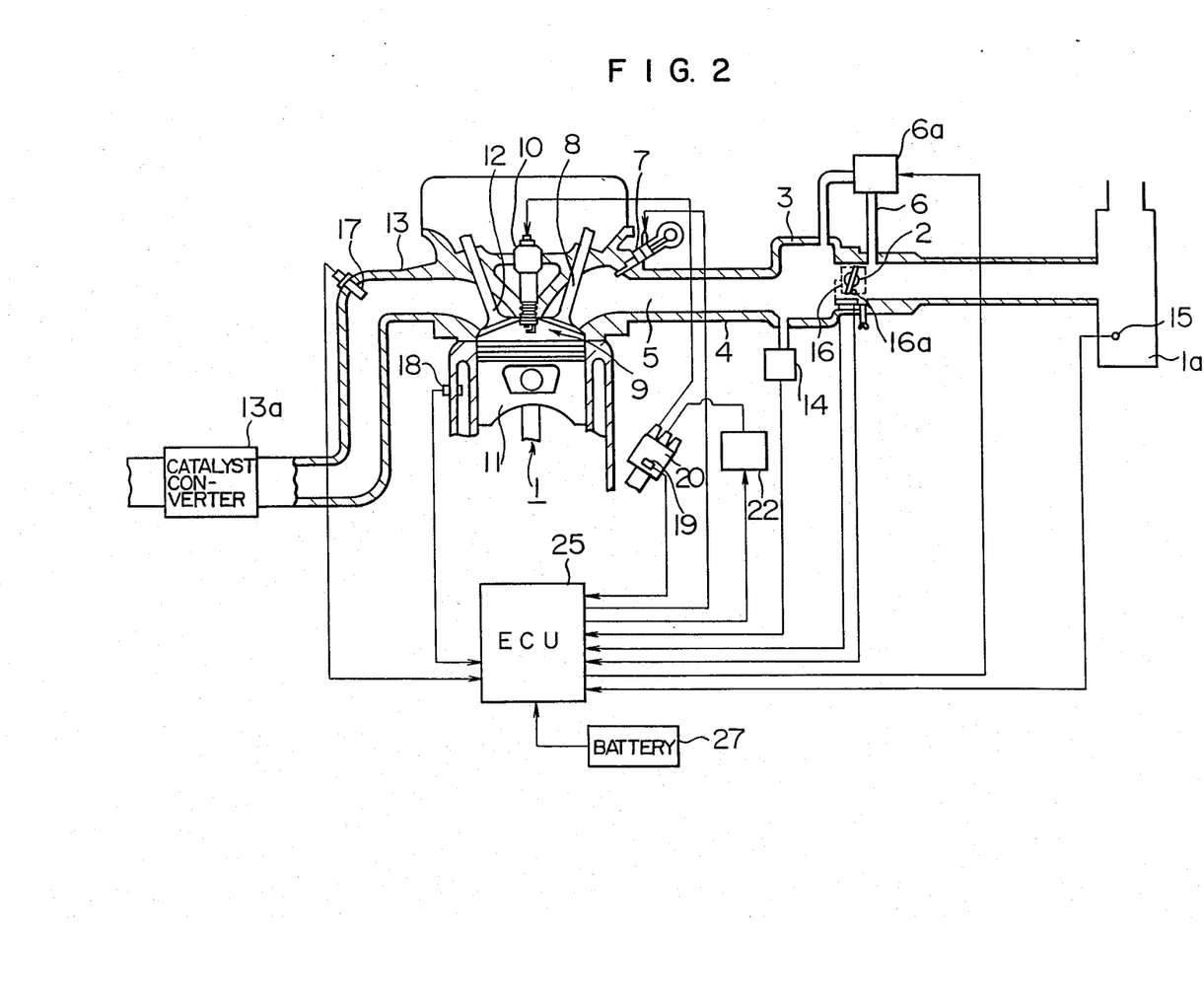
FIG. 2 is a schematic diagram showing a control system for an internal combustion engine and a configuration of the internal combustion engine according to an embodiment of the present invention.

In order to further clarify the configuration according to the present invention described above, control system for an internal combustion engine according to a preferred embodiment of the present invention will be explained below. A configuration of an internal combustion engine control system with an internal combustion engine is schematically shown in FIG. 2.

As shown, in this internal combustion engine 1, the intake air is introduced from an air cleaner 1a, and after the flow rate thereof is controlled by a throttle valve 2 interlocked with an acceleration pedal (not shown) operated by the driver, is led to an intake port 5 through a surge tank 3 and an intake manifold 4. The intake system 6 is provided with a bypass 6 bypassing the throttle valve 2 which bypass 6 includes midway thereof an air control valve 6a for controlling the amount of air passing the bypass 6 by a valve (not shown) driven by motor. This air control valve 6a is usually used to control what is called idle speed by controlling the amount of intake air of the internal combustion engine 1 in idling mode.

The intake manifold 4, on the other hand, is provided with a fuel injection valve 7 which is supplied with fuel through a fuel pipe (not shown) from a fuel tank (not shown). This fuel pipe has midway thereof a pressure regulator (not shown) so that the fuel pressure is maintained at a fixed level. As a result, when an injection pulse is applied to the fuel injection valve 7 and thereby opens the same valve, fuel in an amount exactly proportional to the effective pulse duration t is injected to the intake port 5. The mixture gas generated at the intake port 5 is introduced through the intake valve 8 to the combustion chamber 9 of the internal combustion engine 1, and ignited by a spark formed at the ignition plug 10 at predetermined timings. The combustion chamber 9 is defined by a piston 11, and the exhaust gas generated by combustion of the mixture gas is released into the atmosphere through an exhaust valve 12, an exhaust pipe 13 and a catalyst converter 13 having a ternary catalyst.

The sensors provided for detecting the operating conditions of the internal combustion engine 1 include an intake manifold pressure sensor 14, an intake air temperature sensor 15, a throttle sensor 16, an air-fuel ratio sensor 17, a water temperature sensor 18, and a crank angle sensor 19. The intake manifold pressure sensor 14, which is a kind of a semiconductor pressure sensor, is arranged in the surge tank 3 for producing an analog signal corresponding to the pressure Pm in the intake manifold. The intake air temperature sensor 15 is provided in the air cleaner 1 for producing an analog signal corresponding to the intake air temperature Tam. The throttle sensor 16 is coupled with the rotational shaft of the throttle valve 2 for producing an analog signal corresponding to the opening $\psi$ of the throttle valve 2. This throttle sensor 16 has an idle switch 16a built therein for producing an on-off signal according to the fully-closed and not-fully closed states of the throttle valve 2 respectively. The air-fuel ratio sensor 17 is mounted on the exhaust manifold 13 for producing an analog signal corresponding to the residual oxygen concentration $\lambda$ in the exhaust gas. The water temperature sensor 18, which is mounted on the water jacket of the internal combustion engine 1, produces an analog signal corresponding to the engine cooling water temperature Thw. The crank angle sensor 19, which is arranged in opposed relations with the ring gear formed on the shaft of the distributor 20 coupled to the crankshaft of the internal combustion engine 1, produces a pulse signal at predetermined intervals of crank angle. The distributor 20, as well known, is for distributing a high voltage generated at predetermined timings by an igniter 22 among ignition plugs 10 of the cylinders.

These sensors are connected to an electronic control unit (hereinafter referred to as "ECU") 25 for controlling the amount of fuel injection of the internal combustion engine 1. The ECU 25, which is adapted to operate with the power from the battery 27, is supplied with input signals from the sensors and drives the fuel injection valve 7 according to a predetermined procedure thereby to inject fuel corresponding to the amount of intake air determined by the opening of the throttle valve 2.

Figure 3:
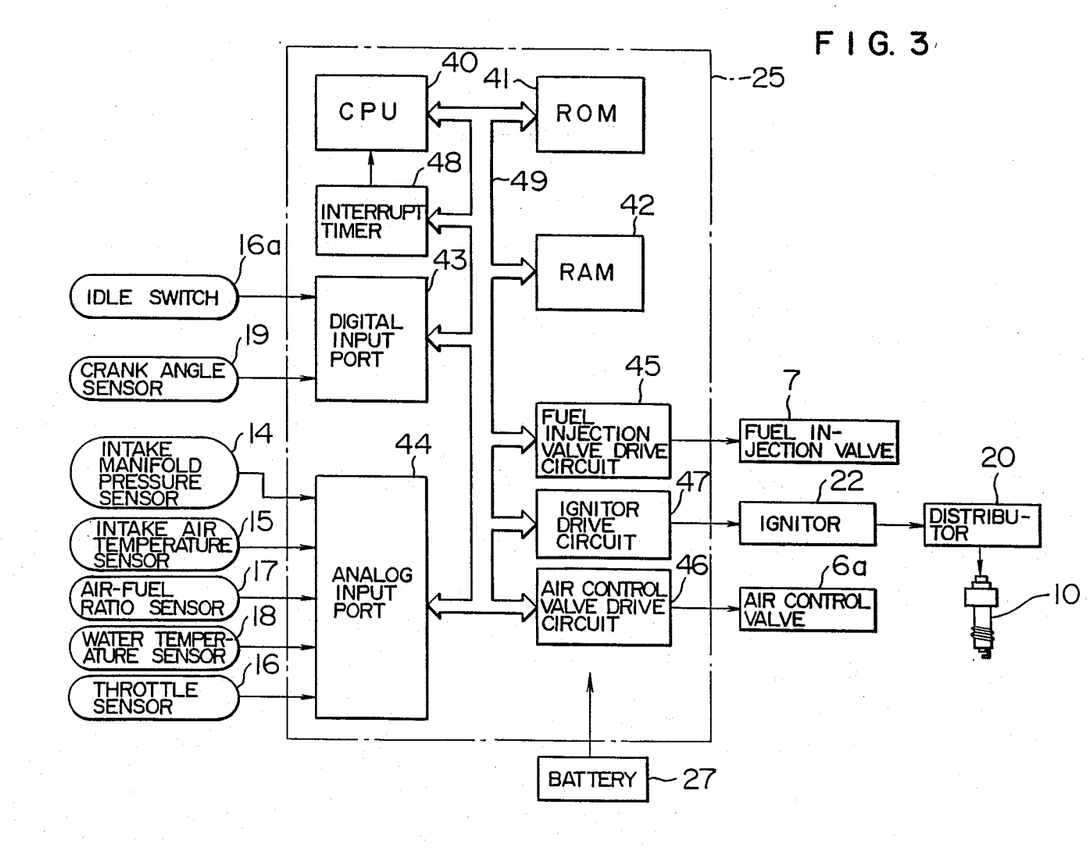
FIG. 3 is a block diagram showing a system configuration built around an electronic control unit (ECU).

FIG. 3 is a block diagram showing a configuration of the ECU 25. As shown, the ECU 25 is built as an arithmetic logic circuit with well-known CPU 40, ROM 41 and RAM 42 as centerpieces. The CPU 40, etc. are connected through a bus 49 with a digital input port 43, an analog input port 44, a fuel injection valve drive circuit 45, an air control valve drive circuit 46, an igniter drive circuit 47, an interrupt timer 48, etc.

The digital input port 43 is connected with an idle switch 16a and the crank angle sensor 19, so that the CPU 40 may read the engine speed N of the internal combustion engine, that is, the rotational angle of the crankshaft or the fully-closed state of the throttle valve 2 through the input port 43. The analog input port 44, on the other hand, is connected with the intake manifold pressure sensor 14, the intake air temperature sensor 15, the throttle sensor 16, the air-fuel ratio sensor 17 and the water temperature sensor 18, and has a function to subject output signals of each sensor to analog-digital conversion. As a consequence, the CPU 40 is capable of reading the intake manifold pressure Pm, intake air temperature Tam, oxygen concentration $\lambda$ in the exhaust gas, cooling water temperature Thw and the opening $\psi$ of the throttle valve 2 of the internal combustion engine 1 sequentially in the form of digital signal through the input port 44.

The fuel injection valve drive circuit 45, including a compare register and a timer (not shown), has a function to open the fuel injection valve 7 when the time counted by the timer comes to coincide with the time written in the compare register. Once a control signal for opening the fuel injection valve 7 is produced from the CPU 40 with the valve-opening time written in the compare register, therefore, the CPU 40 is capable of controlling fuel injection regardless of the timing of the valve opening since the fuel injection valve drive circuit 45 opens the fuel injection valve 7 at the written timings. The air control valve drive circuit 46, on the other hand, has a function to drive the motor of the air control valve 6a forwardly or reversely by a predetermined amount. The CPU 40 is thus capable of increasing or decreasing the amount of intake air of the internal combustion engine 1 by driving the motor of the air control valve 6a by a predetermined amount through the circuit 46 while the car is driving as well as idling. The ignitor drive circuit 47 has a switching element (not shown) for interrupting the application of a voltage from the battery 27 to the primary coil of the boosting transformer not shown of the igniter 22 for switching on and off the primary circuit of the igniter 22 at high speed. By turning on and off the switching element of the circuit 47, therefore, the CPU 40 is capable of producing a high voltage at the secondary circuit of the igniter 22 at the desired timings, so that the high voltage applied through the distributor 20 forms a park on the ignition plug 10 of each cylinder, thus permitting the ignition timing $\theta$ of the internal combustion engine 1 to be freely advanced or retarded.

The interrupt timer 48 is for supplying the CPU 40 with an interrupt signal for starting a program described later which is executed by the CPU 40.

In the control system for an internal combustion engine described above, explanation will be made of the control operation effected by the ECU 25. Upon application thereto of an interrupt signal from the interrupt timer 48, the CPU 40 of the ECU 25 executes the ignition timing correction routine shown in FIG. 4A as an interrupt routine. The ignition timing $\theta$ is determined on the basis of a basic ignition timing from the load (Q/N), engine speed N and the air-fuel ratio (A/F) obtained from the signal from the air-fuel ratio sensor 17 of the internal combustion engine 1 in a well-known ignition timing calculation routine executed separately from the routine of FIG. 4A. The ignition timing $\theta$ is thus finally determined by correcting the basic ignition timing $\theta_{base}$ using the ignition timing correction routine shown in FIG. 4A.

Figure 5:
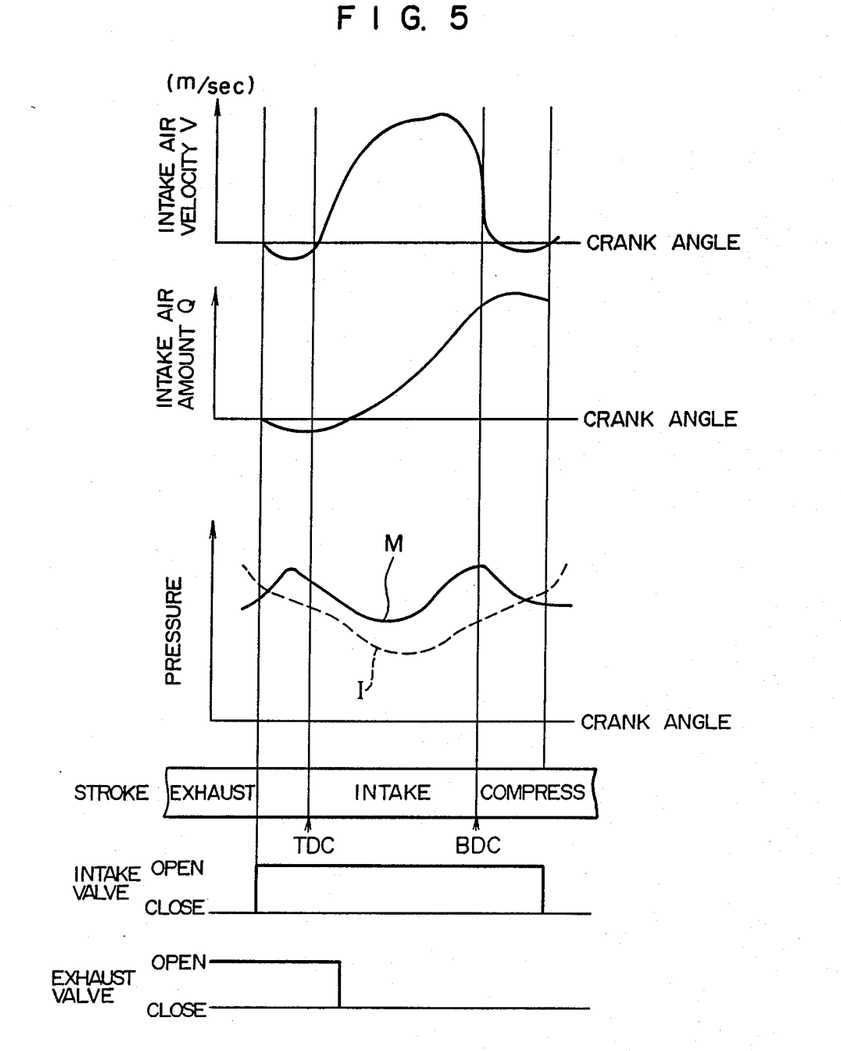
FIG. 5 is a graph showing the relationship between the intake air velocity V, amount of intake air Q, pressure Pm (Pi), etc.

First, in order to determine the amount of air Q sucked into the cylinder, step 110 reads the intake manifold pressure signal Pm from the intake manifold pressure sensor 14 through the analog input port 44. In preparation for subsequent processing, this intake manifold pressure signal Pm is stored in a predetermined area of the RAM 42. The relationship between the intake air flow rate V, amount of intake air Q, pressure of intake manifold Pm and the pressure in the cylinder Pi in intake stroke is shown in the graph of FIG. 5. As seen from this graph, the intake air flow rate V is substantially zero and the intake manifold pressure Pm (solid line M in FIG. 5) is substantially equal to the pressure Pi in cylinder (dashed line I in FIG. 5) at predetermined timings from the bottom dead center to the end of the intake stroke. In other words, it is possible to determine the cylinder pressure Pi by measuring the intake manifold pressure Pm. In view of the fact that a cylinder pressure Pi at the ending portion in intake stroke best reflects the filling efficiency of air in a given cylinder in intake stroke, the amount of intake air Q can be determined most accurately at this time. Step 120, therefore, calculates the amount of intake air Q from the intake manifold pressure signal Pm read in step 110 by use of a map or the like stored in the ROM 41.

Figure 6:
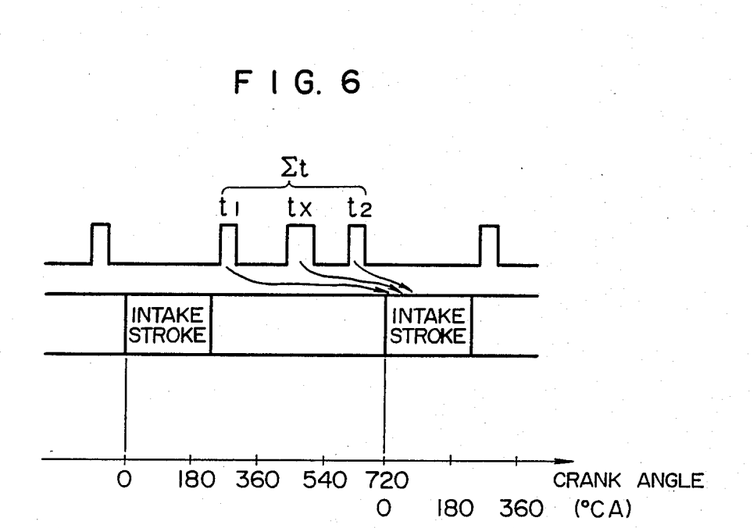
FIG. 6 is a diagram for explaining the manner in which the total amount of fuel injection $\tau$ is determined.

The next step 130 estimates the total amount of fuel $\tau$ sucked into the cylinder. The estimation of the total fuel amount $\tau$ is effected by determining the total fuel amount injected from the end of the previous intake stroke to the present time. Specifically, in view of the fact that the effective injection pulse duration t of the fuel injection pulse is proportional to the amount of fuel injection, as shown in FIG. 6, the effective injection pulse duration t1, t2 of the fuel injection pulse for execution of synchronous injection is added to the effective injection pulse duration tx or the like of the fuel injection pulse for execution of the asynchronous injection. The fuel injection amount thus estimated is stored in a predetermined area of the RAM 42.

The next step 140 is to divide the total amount of intake air Q calculated at step 120 by the total fuel amount estimated at step 130 (Q/$\tau$) thereby to obtain an estimated air-fuel ratio A/Fobs. This estimated air-fuel A/Fobs is a value estimated as an air-fuel ratio of the mixture gas involved in the combustion after the intake stroke. This estimated air-fuel A/Fobs, therefore, can be used to determine the air-fuel ratio of the mixture gas introduced into the cylinder before combustion. The next step 150 determines a corrected value of ignition timing $\theta_k$ on the basis of the estimated air-fuel ratio A/Fobs, followed by step 160 where the corrected value of ignition timing $\theta_k$ is added to the basic ignition timing $\theta_{base}$ determined at another ignition timing calculation routine thereby to determine the final ignition timing $\theta$.

The basic ignition timing $\theta_{base}$ of the internal combustion engine is already determined by the air-fuel ratio A/F of the internal combustion engine 1 detected by the air-fuel ratio sensor 17, the engine speed N of the internal combustion engine 1 and the load of the same engine in the ignition timing calculation routine. The air-fuel ratio A/F used in this calculation however, corresponds to the air-fuel ratio of the mixture gas which has already been combusted. The air-fuel ratio A/Fobs estimated in the routine under consideration, on the other hand, is the one for the mixture gas yet to be ignited. Step 150, therefore, determines the corrected value $\theta_k$ on the basis of deviation between the two air-fuel ratios to obtain an ignition timing $\theta$ more suitable for the air-fuel ratio of the mixture gas sucked into the cylinder. The compression stroke before ignition of the mixture gas provides an ample time for correcting the ignition timing $\theta$.

Figure 4A:
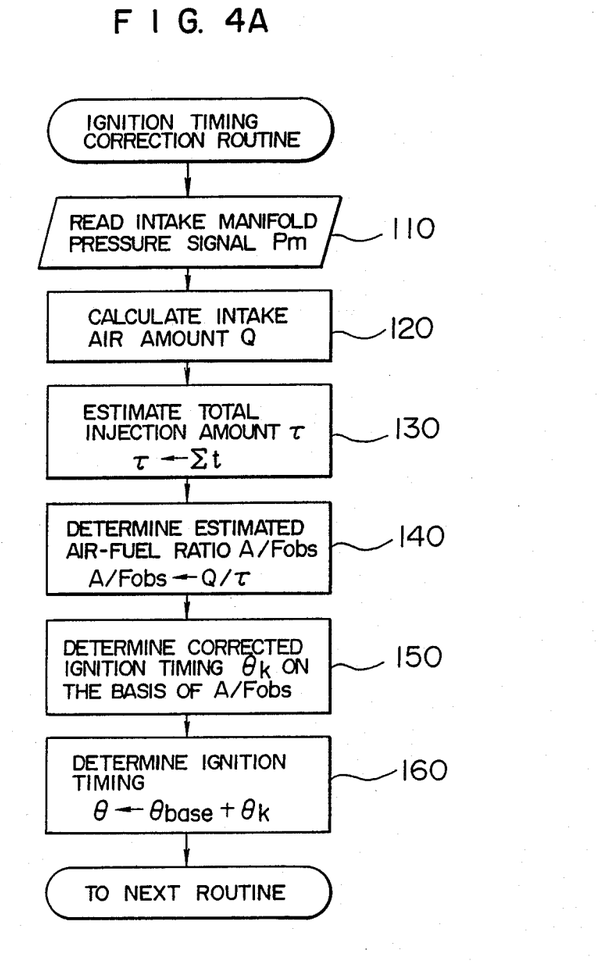
FIGS. 4A to 4C are flowcharts showing an ignition timing correction routine executed by the electronic control unit.
Figure 4B:
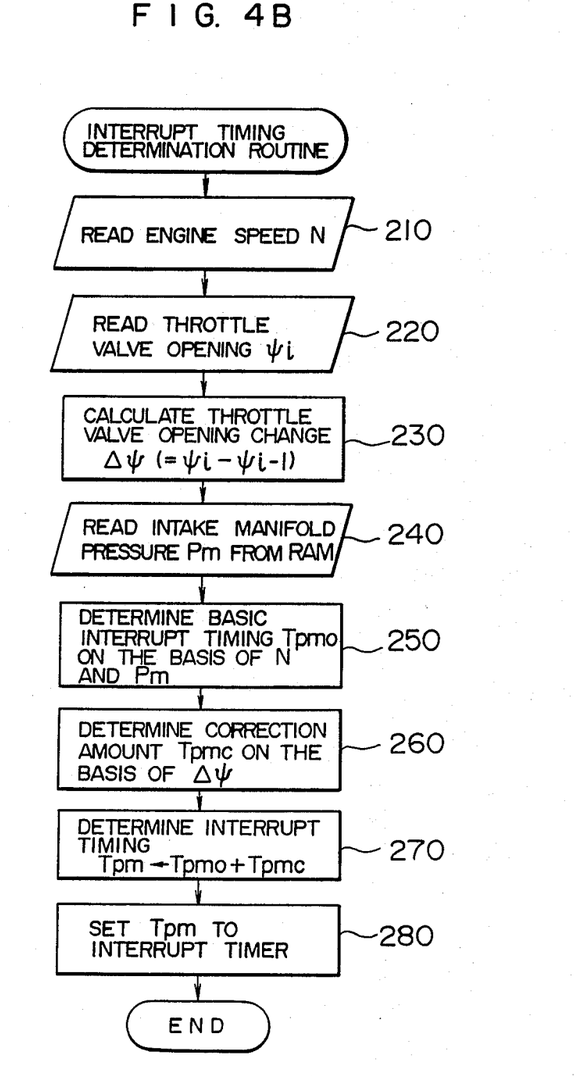

After the above-mentioned processes (steps 110 to 160), the interrupt timing determining routine shown in FIG. 4B is executed. This routine is for determining an output timing of the interrupt signal produced to the CPU 40 from the interrupt timer 48 for executing the above-mentioned ignition timing correction routine.

Figure 4C:
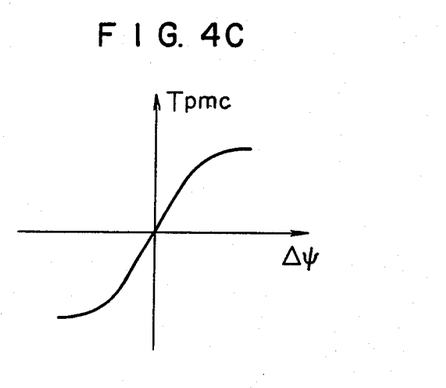

In this routine, first, step 210 reads the engine speed N through a digital input port 43. Step 220 reads the throttle valve opening $\psi$ through an analog input port 44. Step 230 calculates the amount of change in throttle valve opening $\Delta\psi$ from the throttle valve opening $\psi_{i-1}$ read in the previous routine and the throttle valve opening $\psi_i$ read at step 220. Step 240 reads the intake manifold pressure Pm read and stored at the above-mentioned ignition timing correcting routine. Step 250 determines the basic interrupt timing Tpmo of the above-mentioned ignition timing correcting routine corresponding to the map stored in the ROM 41 on the basis of the engine speed N read at step 210 and the intake manifold pressure Pm read at step 240. This basic interrupt timing Tpmo is set as a time period that has lapsed from the bottom dead center of the cylinder in the next intake stroke. The next step 260 determines the correction amount Tpmc corresponding to the map stored in the ROM 41 on the basis of the throttle valve change amount Δψ calculated at step 230. This correction amount Tpmc is set in advance in the map as shown in FIG. 4C against the throttle valve change amount Δψ. Step 270 corrects by addition to the basic interrupt timing Tpmo with the correction amount Tpmc thereby to determine the interrupt timing Tpm. Step 280 sets the interrupt timing Tpm determined at step 270 to the interrupt timer 48. Now, this routine is over.

In the internal combustion engine control system according to the embodiment described above, the amount of intake air Q is determined by use of the intake manifold pressure Pm at the above-mentioned timings after bottom dead center of the intake stroke, and therefore the amount of intake air Q can be determined with high accuracy, so that the air-fuel ratio of the mixture gas (A/Fobs) before combustion is estimated accurately for proper control of the ignition timing of the mixture gas. As a result, knocking or exhaust gases are sufficiently controlled by control of ignition timings.

In the embodiment under consideration, the intake manifold pressure Pm providing a basis for calculation of the amount of intake air Q is detected only at one timing after bottom dead center. Instead, a plurality of times of sampling to determine an average value as an intake manifold pressure Pm is desirous for protection from external disturbances or the like.

The present invention is not limited to the embodiment described above but is applicable with equal effect to a configuration in which the amount of fuel injection or the amount of intake air in a cylinder facing the intake stroke instead of ignition timing is controlled, or a configuration in which the operating conditions of the internal combustion engine are controlled on the basis of parameters including the load (Q/N) of the internal combustion engine obtained from the engine speed N and the amount of intake air Q determined from the intake manifold pressure Pm in place of the air-fuel ratio A/F, without departing from the spirit of the present invention.

We claim:

1. A control system for controlling operating conditions of an internal combustion engine having at least one cylinder, comprising:
   an intake air pressure sensor, arranged on an intake manifold connected to the cylinder of the internal combustion engine, for continuously generating a pressure signal corresponding to a pressure of the intake air in the intake manifold;
   intake air amount detection means coupled to said intake air pressure sensor, and responsive to said pressure signal at a predetermined short timing after a bottom dead center in an intake stroke of the cylinder of the internal combustion engine, for determining an amount of intake air being taken into the intake manifold from said pressure signal at said timing after bottom dead center;
   control parameter setting means for setting a control parameter to control the internal combustion engine on the basis of the intake air amount detected by the intake air amount detection means; and
   means for driving an actuator of the engine dependent on said control parameter.

2. A system according to claim 1, wherein said intake air pressure amount means includes means for determining said predetermined timing at which a signal corresponding to the intake air pressure in the intake manifold is retrieved as a timing when the pressure in the cylinder is substantially equal to the intake air pressure in the intake manifold.

3. A system according to claim 1, further comprising engine speed detection means for detecting the engine speed of the internal combustion engine, and wherein said intake air amount detection means includes means for determining the predetermined timing of said signal in accordance with the engine speed detected by the engine speed detection means.

4. A system according to claim 1, further comprising engine speed detection means for detecting an engine speed of the internal combustion engine, memory means for storing an intake air pressure detected by the intake air amount detection means, and wherein said intake air amount detection means includes means for determining the predetermined timing of retrieving a signal in accordance with the engine speed detected by the engine speed detection means and the intake air pressure stored in the memory means.

5. A system according to claim 1, wherein said control parameter setting means sets an ignition timing of a cylinder as the control parameter of the engine, and said actuator driving means drives an actuator which controls the ignition timing of the cylinder of the internal combustion engine.

6. A system as in claim 1 further comprising memory means storing a map with a correspondence between a pressure of intake air in the intake manifold, said predetermined timing after bottom dead center, and an amount of intake air, and wherein said intake air amount detection means determines said amount of intake air by accessing said map.

7. A system as in claim 5 further comprising a memory means storing a map with a correspondence between a pressure of intake air in the intake manifold, said predetermined timing after bottom dead center, and an amount of intake air, and wherein said intake air amount detection means determines said amount of intake air by accessing said map.

8. A system as in claim 7 further comprising means for estimating a total fuel injection amount, and means for determining an estimated air-fuel ratio before combustion by dividing said intake air amount by said total fuel injection amount.

9. A control system for controlling operating conditions of an internal combustion engine having at least one cylinder, an intake manifold and a throttle valve in the intake manifold, comprising:
   an intake air pressure sensor, arranged on an intake manifold connected to the cylinder of the internal combustion engine, for continuously generating a pressure signal corresponding to a pressure of the intake air in the intake manifold;
   intake air pressure detection means coupled to said intake air pressure sensor, and responsive to said pressure signal for determining, at a predetermined timing after a bottom dead center in an intake stroke of the cylinder of the internal combustion engine, a pressure of intake air being taken into the intake manifold;

control parameter setting means for setting a control parameter to control the internal combustion engine on the basis of the intake air pressure detected by the intake air pressure detection means;

means for driving an actuator of the engine dependent on said control parameter;

engine speed detection means for detecting an engine speed of the internal combustion engine;

memory means for storing the intake air pressure detected by the intake air pressure detection means, and wherein said intake air pressure detection means includes means for determining the predetermined timing of retrieving a signal of the intake air pressure detection means in accordance with the engine speed detected by the engine speed detection means and the intake air pressure stored in the memory means;

means for detecting a change in an opening amount of the throttle valve provided in the intake manifold; and correction means for adjusting said predetermined timing of said signal in accordance with the change of the throttle valve opening amount detected by the throttle valve opening change detection means.

10. A control system for controlling operating conditions of an internal combustion engine having at least one cylinder, comprising:

an intake air pressure sensor, arranged on an intake manifold connected to the cylinder of the internal combustion engine, for continuously generating a pressure signal corresponding to a pressure of the intake air in the intake manifold;

intake air pressure detection means coupled to said intake air pressure sensor, and responsive to said pressure signal for determining, at a predetermined timing after a bottom dead center in an intake stroke of the cylinder of the internal combustion engine, a pressure of intake air being taken into the intake manifold;

control parameter setting means for setting a control parameter to control the internal combustion engine on the basis of the intake air pressure detected by the intake air pressure detection means;

means for driving an actuator of the engine dependent on said control parameter;

fuel supply means arranged on the intake manifold of the internal combustion engine for supplying fuel to the internal combustion engine;

means for estimating an amount of fuel supplied to the cylinder of the internal combustion engine by the fuel supply means; and means for estimating the air-fuel ratio of the mixture gas supplied into the cylinder on the basis of the amount of fuel supply estimated by the supplied fuel amount estimating means and the intake air pressure detected by said intake air pressure detection means, wherein said control parameter setting means is also responsive to the air-fuel ratio estimated.

11. A system according to claim 10, wherein said fuel supply means is an electrically-operated fuel injection valve for injecting fuel in an amount corresponding to the time length of an electrical pulse signal supplied thereto, and the supplied fuel amount estimating means estimates the amount of fuel supply in accordance with the time length of the electrical pulse signal supplied to the fuel injection valve.

12. A method for controlling operating conditions of an internal combustion engine having at least one cylinder, comprising the steps of:

using an intake air pressure sensor, arranged on an intake manifold, for generating a signal corresponding to a pressure of the intake air in the intake manifold;

receiving a signal corresponding to a pressure of the intake air in the intake manifold at a predetermined short timing after a bottom dead center in an intake stroke of the cylinder of the internal combustion engine;

determining an amount of intake air in the intake manifold from said signal;

setting a control parameter to control the internal combustion engine on the basis of the intake air pressure detected; and driving an actuator of the engine dependent on said control parameter.

13. A method as in claim 12 comprising the further steps of storing a map with a correspondence between a pressure of intake air in the intake manifold, said predetermined timing after bottom dead center, and an amount of intake air; and determining said amount of intake air by accessing said map.

14. A method as in claim 12 wherein said predetermined time is a timing when pressure in the cylinder is substantially equal to intake air pressure in the intake manifold.

* * * * *